(12) United States Patent
Baumgarte et al.

(10) Patent No.: US 7,693,721 B2
(45) Date of Patent: Apr. 6, 2010

(54) HYBRID MULTI-CHANNEL/CUE CODING/DECODING OF AUDIO SIGNALS

(75) Inventors: Frank Baumgarte, Watchung, NJ (US); Peter Kroon, Green Brook, NJ (US)

(73) Assignee: Agere Systems Inc., Allentown, PA (US)

( * ) Notice: Subject to any disclaimer, the term of this patent is extended or adjusted under 35 U.S.C. 154(b) by 9 days.

(21) Appl. No.: 11/953,382

(22) Filed: Dec. 10, 2007

(65) Prior Publication Data
US 2008/0091439 A1 Apr. 17, 2008

Related U.S. Application Data

(63) Continuation of application No. 10/936,464, filed on Sep. 8, 2004, which is a continuation-in-part of application No. 09/848,877, filed on May 4, 2001, now Pat. No. 7,116,787, and a continuation-in-part of application No. 10/045,458, filed on Nov. 7, 2001, now abandoned, and a continuation-in-part of application No. 10/155,437, filed on May 24, 2002, now Pat. No. 7,006,636, and a continuation-in-part of application No. 10/246,570, filed on Sep. 18, 2002, now Pat. No. 7,292,901, and a continuation-in-part of application No. 10/815,591, filed on Apr. 1, 2004.

(60) Provisional application No. 60/585,703, filed on Jul. 6, 2004, provisional application No. 60/311,565, filed on Aug. 10, 2001, provisional application No. 60/391,095, filed on Jun. 24, 2002, provisional application No. 60/544,287, filed on Feb. 12, 2004.

(51) Int. Cl.
*G06F 15/00* (2006.01)
*G10L 11/00* (2006.01)
*G10L 19/00* (2006.01)

(52) U.S. Cl. .......... 704/501; 704/500; 704/200

(58) Field of Classification Search .......... 704/200, 704/501
See application file for complete search history.

(56) References Cited

U.S. PATENT DOCUMENTS 4,236,039 A 11/1980 Cooper .................. 381/23

(Continued)

FOREIGN PATENT DOCUMENTS

CN 1295778 5/2001

(Continued)

OTHER PUBLICATIONS

"Binaural Cue Coding: Rendering of Sources Mixed into a Mono Signal" by Christof Faller, Media Signal Processing Research, Agere Systems, Allentown, PA, USA, 2 pages.

(Continued)

*Primary Examiner*—David R Hudspeth
*Assistant Examiner*—Justin W Rider
(74) *Attorney, Agent, or Firm*—Mendelsohn, Drucker & Associates, P.C.; Steve Mendelsohn

(57) ABSTRACT

Part of the spectrum of two or more input signals is encoded using conventional coding techniques, while encoding the rest of the spectrum using binaural cue coding (BCC). In BCC coding, spectral components of the input signals are downmixed and BCC parameters (e.g., inter-channel level and/or time differences) are generated. In a stereo implementation, after converting the left and right channels to the frequency domain, pairs of left- and right-channel spectral components are downmixed to mono. The mono components are then converted back to the time domain, along with those left- and right-channel spectral components that were not downmixed, to form hybrid stereo signals, which can then be encoded using conventional coding techniques. For playback, the encoded bitstream is decoded using conventional decoding techniques. BCC synthesis techniques may then apply the BCC parameters to synthesize an auditory scene based on the mono components as well as the unmixed stereo components.

17 Claims, 3 Drawing Sheets

U.S. PATENT DOCUMENTS

| | | | |
|---|---|---|---|
| 4,815,132 A | 3/1989 | Minami | 381/1 |
| 4,972,484 A | 11/1990 | Theile et al. | 704/200.1 |
| 5,371,799 A | 12/1994 | Lowe et al. | 381/25 |
| 5,463,424 A | 10/1995 | Dressler | 348/485 |
| 5,579,430 A | 11/1996 | Grill et al. | 395/2.12 |
| 5,583,962 A | 12/1996 | Davis et al. | 395/2.38 |
| 5,677,994 A | 10/1997 | Miyamori et al. | 704/501 |
| 5,682,461 A | 10/1997 | Silzle et al. | 395/2.14 |
| 5,701,346 A * | 12/1997 | Herre et al. | 381/18 |
| 5,703,999 A | 12/1997 | Herre et al. | 395/2.12 |
| 5,706,309 A | 1/1998 | Eberlein et al. | 375/260 |
| 5,771,295 A | 6/1998 | Waller, Jr. | 381/18 |
| 5,812,971 A | 9/1998 | Herre | 704/500 |
| 5,825,776 A | 10/1998 | Moon | 370/437 |
| 5,860,060 A * | 1/1999 | Li et al. | 704/500 |
| 5,878,080 A | 3/1999 | Ten Kate | 375/241 |
| 5,889,843 A | 3/1999 | Singer et al. | 379/202.01 |
| 5,890,125 A | 3/1999 | Davis et al. | 704/501 |
| 5,912,976 A | 6/1999 | Klayman et al. | 381/18 |
| 5,930,733 A | 7/1999 | Park et al. | 702/76 |
| 5,946,352 A * | 8/1999 | Rowlands et al. | 375/242 |
| 5,956,674 A * | 9/1999 | Smyth et al. | 704/200.1 |
| 6,016,473 A | 1/2000 | Dolby | 704/500 |
| 6,021,386 A | 2/2000 | Davis et al. | 704/229 |
| 6,021,389 A | 2/2000 | Protopapas | 704/278 |
| 6,108,584 A | 8/2000 | Edwards | 700/94 |
| 6,111,958 A | 8/2000 | Maher | 381/17 |
| 6,131,084 A | 10/2000 | Hardwick | 704/230 |
| 6,205,430 B1 * | 3/2001 | Hui | 704/500 |
| 6,236,731 B1 | 5/2001 | Brennan et al. | 381/316 |
| 6,282,631 B1 * | 8/2001 | Arbel | 712/35 |
| 6,356,870 B1 * | 3/2002 | Hui et al. | 704/500 |
| 6,408,327 B1 | 6/2002 | McClennon et al. | 709/204 |
| 6,424,939 B1 | 7/2002 | Herre et al. | 704/219 |
| 6,434,191 B1 | 8/2002 | Agrawal et al. | 375/227 |
| 6,539,357 B1 | 3/2003 | Sinha | 704/270.1 |
| 6,614,936 B1 | 9/2003 | Wu et al. | 382/238 |
| 6,658,117 B2 | 12/2003 | Hasebe | 381/61 |
| 6,763,115 B1 | 7/2004 | Kobayashi | 381/309 |
| 6,782,366 B1 * | 8/2004 | Huang et al. | 704/500 |
| 6,823,018 B1 | 11/2004 | Jafarkhani et al. | 375/245 |
| 6,845,163 B1 | 1/2005 | Johnston et al. | 381/92 |
| 6,850,496 B1 | 2/2005 | Knappe et al. | 370/260 |
| 6,934,676 B2 | 8/2005 | Wang et al. | 704/200.1 |
| 6,940,540 B2 | 9/2005 | Beal et al. | 348/169 |
| 6,973,184 B1 | 12/2005 | Shaffer et al. | 379/420.01 |
| 7,116,787 B2 | 10/2006 | Faller | 381/17 |
| 7,382,886 B2 | 6/2008 | Henn et al. | 381/23 |
| 7,516,066 B2 | 4/2009 | Schuijers et al. | 704/219 |
| 2001/0031054 A1 * | 10/2001 | Grimani | 381/98 |
| 2002/0055796 A1 | 5/2002 | Katayama et al. | 700/94 |
| 2003/0035553 A1 | 2/2003 | Baumgarte et al. | 381/94.2 |
| 2003/0081115 A1 | 5/2003 | Curry et al. | 348/14.12 |
| 2003/0161479 A1 | 8/2003 | Yang et al. | 381/22 |
| 2003/0187663 A1 | 10/2003 | Truman et al. | 704/500 |
| 2003/0219130 A1 | 11/2003 | Baumgarte et al. | 381/17 |
| 2003/0236583 A1 | 12/2003 | Baumgarte et al. | 700/94 |
| 2004/0091118 A1 | 5/2004 | Griesinger | 381/20 |
| 2005/0053242 A1 | 3/2005 | Henn et al. | 381/22 |
| 2005/0069143 A1 | 3/2005 | Budnikov et al. | 381/63 |
| 2005/0157883 A1 | 7/2005 | Herre et al. | 381/17 |
| 2005/0226426 A1 | 10/2005 | Oomen et al. | 381/23 |
| 2006/0206323 A1 | 9/2006 | Breebaart | 704/230 |

FOREIGN PATENT DOCUMENTS

| | | |
|---|---|---|
| EP | 1 107 232 A2 | 6/2001 |
| EP | 1 376 538 A1 | 1/2004 |
| EP | 1 479 071 B1 | 1/2006 |
| JP | 07123008 | 5/1995 |
| RU | 2214048 C2 | 10/2003 |
| TW | 347623 | 12/1998 |
| TW | 360859 | 6/1999 |
| TW | 444511 | 7/2001 |
| TW | 510144 | 11/2002 |
| TW | 517223 | 1/2003 |
| TW | 521261 | 2/2003 |
| WO | WO 03/090207 A1 | 10/2003 |
| WO | WO 03/094369 A2 | 11/2003 |
| WO | WO 2004/008806 A1 | 1/2004 |
| WO | WO 2004/049309 A1 | 6/2004 |
| WO | WO 2004/077884 A1 | 9/2004 |
| WO | WO 2004/086817 A2 | 10/2004 |
| WO | WO 2005/069274 A1 | 7/2005 |

OTHER PUBLICATIONS

"HILN- The MPEG-4 Parametric Audio Coding Tools" by Heiko Purnhagen and Nikolaus Meine, University of Hannover, Hannover, Germany, 4 pages.

"Parametric Audio Coding" by Bernd Edler and Heiko Purnhagen, University of Hannover, Hannover, Germany, pp. 1-4.

"Advances in Parametric Audio Coding" by Heiko Purnhagen, Proc. 1999 IEEE Workshop on Applications of Signal Processing to Audio and Acoustics, New Paltz, New York, Oct. 17-20, 1999, pp. W99-1-W99-4.

"Surround Sound Past, Present, and Future" by Joseph Hull; Dolby Laboratories Inc.; 1999; 8 pages.

"Spatial Audio Coding: Next-Generation Efficient and Compatible Coding of Multi-Channel Audio," by J. Herre et al., Audio Engineering Society Convention Paper Presented at the 117$^{th}$ Convention, Oct. 28-31, 2004, San Francisco, CA, XP-002343375, pp. 1-13.

"MPEG Audio Layer II: A Generic Coding Standard For Two and Multichannel Sound for DVB, DAB and Computer Multimedia," by G. Stoll, International Broadcasting Convention, Sep. 14-18, 1995, Germany, XP006528918, pp. 136-144.

"Coding of Spatial Audio Compatible With Different Playback Formats", by Christof Faller, Audio Engineering Society 117$^{th}$ Convention, San Francisco, CA, Oct. 28-31, 2004, pp. 1-12.

"Information Technology—Coding of Audio-Visual Objects—Part 1: MPEG Surround (ISO/IEC JTC 1/SC 29/WG11 N7387)," Jul. 2005, International Organization for Standardization, Poznan, Poland, XP00237055, p. 46, lines 1,2.

"Parametric Coding of Spatial Audio—Thesis No. 3062," by Christof Faller, These Presentee a La Faculte Informatique et Communications Institit De Systemes De Communication Section Des Systems De Communication Ecole Polytechnique Fédérale De Lausanne Pour L'Obtention Du Grade De Docteur Es Sciences, 2004, XP002343263, Laussane, Section 5.3, pp. 71-84.

"Spatial Audio Coding: Next-Generation Efficient and Compatible Coding of Multi-Channel Audio," by J. Herre et al., Audio Engineering Society Convention Paper Presented at the 117$^{th}$ Convention, Oct. 28-31, 2004, San Francisco, CA, XP-002343375, pp. 1-13.

"Binaural Cue Coding: Rendering of Sources Mixed into a Mono Signal" by Christof Faller, Media Signal Processing Research, in Proc. DAGA 2003, Aachen, Germany, Mar. 2003 (invieted), 2 pages.

"A Speech Corpus for Multitalker Communications Research", by Robert S. Bolia, et al., J. Acoust. Soc., Am., vol. 107, No. 2, Feb. 2000, pp. 1065-1066.

"Synthesized Stereo Combined with Acoustic Echo Cancellation for Desktop Conferencing", by Jacob Benesty et al., Bell Labs Technical Journal, Jul.-Sep. 1998, pp. 148-158.

"The Role of Perceived Spatial Separation in the Unmasking of Speech", by Richard Freyman et al., J. Acoust. Soc., Am., vol. 106, No. 6, Dec. 1999, pp. 3578-3588.

"Text of ISO/IEC 14496-3:2002/PDAM 2 (Parametric coding for High Quality Audio)", by International Organisation for Standisation ISO/IEC JTC1/SC29/WG11 Coding of Moving Pictures and Audio, MPEG2002 N5381 Awaji Island, Dec. 2002, pp. 1-69.

"Binaural Cue Coding—Part I: Psychoacoustic Fundamentals and Design Principles", by Frank Baumgrate et al., IEEE Transactions on Speech and Audio Processing, vol. II, No. 6, Nov. 2003, pp. 509-519.

"Binaural Cue Coding—Part II: Schemes and Applications", by Christof Faller et al., IEEE Transactions on Speech and Audio Processing, vol. II, No. 6, Nov. 2003, pp. 520-531.

"Binaural Cue Coding Applied to Stereo and Multi-Channel Audio Compression", by Christof Faller et al., Audio Engineering Society Convention Paper, 112$^{th}$ Convention, Munich, Germany, May 10-13, 2002, pp. 1-9.

"Advances in Parametric Coding for High-Quality Audio", by Erik Schuijers et al., Audio Engineerying Society Convention Paper 5852, 114$^{th}$ Convention, Amsterdam, The Netherlands, Mar. 22-25, 2003, pp. 1-11.

"Colorless Artificial Reverberation", by M.R. Schroeder et al., IRE Transactions on Audio, pp. 209-214, (Originally Published by: J. Audio Engrg. Soc., vol. 9, pp. 192-197, Jul. 1961).

"Efficient Representation of Spatial Audio Using Perceptual Parametrization",, by Christof Faller etl al., IEEE Workshop on Applications of Signal Processing to Audio and Acoustics 2001, Oct. 21-24, 2001, New Paltz, New York, pp. W2001-01 to W2001-4.

"3D Audio and Acoustic Environment Modeling" by William G. Gardner, HeadWize Technical Paper, Jan. 2001, pp. 1-11.

"Responding to One of Two Simultaneous Message", by Walter Spieth et al., The Journal of the Acoustical Society of America, vol. 26, No. 3, May 1954, pp. 391-396.

"Low Complexity Parametric Stereo Coding", by Erik Schuijers et al., Audio Engineering Society 116$^{th}$ Convention Paper 6073, May 8-11, 2004, Berlin, Germany, pp. 1-11.

"MP3 Surround: Efficient and Compatible Coding of Multi-Channel Audio", by Juergen Herre et al., Audio Engineering Society 116$^{th}$ Convention Paper, May 8-11, 2004, Berlin, Germany, pp. 1-14.

"Final text for DIS 11172-1 (rev. 2): Information Technology-Coding of Moving Pictures and Associated Audio for Digital Storage Media—Part 1," ISO/IEC JTC 1/SC 29 N. 147, Apr. 20, 1992 Section 3: Audio, XP-002083108, 2 pages.

"Advances in Parametric Coding for High-Quality Audio," by E.G.P. Schuijers et al., Proc. 1$^{st}$ IEEE Benelux Workshop on Model Based Processing and Coding of Audio (MPCA-2002), Leuven, Belgium, Nov. 15, 2002, pp. 73-79, XP001156065.

"Improving Audio Codecs by Noise Substitution," by Donald Schulz, Journal of the Audio Engineering Society, vol. 44, No. 7/8, Jul./Aug. 1996, pp. 593-598, XP000733647.

"The Reference Model Architecture for MPEG Spatial Audio Coding," by Juergen Herre et al., Audio Engineering Society Convention Paper 6447, 118$^{th}$ Convention, May 28-31, 2005, Barcelona, Spain, pp. 1-13, XP009059973.

"From Joint Stereo to Spatial Audio Coding—Recent Progress and Standardization," by Jurgen Herre, Proc. of the 7$^{th}$ Int. Conference on Digital Audio Effects (DAFx' 04), Oct. 5-8, 2004, Naples, Italy, XP002367849.

"Multichannel Natural Music Recording Based on Psychoacoustic Principles", by Gunther Theile, Extended version of the paper presented at the AES 19$^{th}$ International Conference, May 2001, pp. 1-45.

* cited by examiner

HYBRID MULTI-CHANNEL/CUE CODING/DECODING OF AUDIO SIGNALS

CROSS-REFERENCE TO RELATED APPLICATIONS

This is a continuation of co-pending U.S. application Ser. No. 10/936,464, filed on Sep. 8, 2004, which (1) claimed the benefit of the filing date of U.S. provisional application No. 60/585,703, filed on Jul. 6, 2004, the teachings of which are incorporated herein by reference, and (2) was a continuation-in-part of the following applications, the teachings of all of which are incorporated herein by reference:

U.S. application Ser. No. 09/848,877 ("the '877 application"), filed on May 4, 2001 and issued as U.S. Pat. No. 7,116,787 on Oct. 3, 2006;

U.S. application Ser. No. 10/045,458 ("the '458 application"), filed on Nov. 7, 2001, now abandoned, which itself claimed the benefit of the filing date of U.S. provisional application No. 60/311,565, filed on Aug. 10, 2001;

U.S. application Ser. No. 10/155,437 ("the '437 application"), filed on May 24, 2002 and issued as U.S. Pat. No. 7,006,636 on Feb. 28, 2006;

U.S. application Ser. No. 10/246,570, filed on Sep. 18, 2002 and issued as U.S. Pat. No. 7,292,901 on Nov. 6, 2007, which itself claimed the benefit of the filing date of U.S. provisional application No. 60/391,095, filed on Jun. 24, 2002; and U.S. application Ser. No. 10/815,591, filed on Apr. 1, 2004, which itself claimed the benefit of the filing date of U.S. provisional application No. 60/544,287, filed on Feb. 12, 2004.

The subject matter of this application is related to the subject matter of U.S. patent application Ser. No. 10/246,165 ("the '165 application"), filed on Sep. 18, 2002 4 and issued as U.S. Pat. No. 7,039,204 on May 2, 2006, the teachings of which are incorporated herein by reference.

BACKGROUND OF THE INVENTION

1. Field of the Invention

The present invention relates to the encoding of audio signals and the subsequent decoding of the encoded audio signals to generate an auditory scene during playback.

2. Description of the Related Art

In conventional stereo audio coding, the sum and the difference of the left and right audio channels of the stereo input signal are formed and then individually coded, e.g., using adaptive differential pulse code modulation (ADPCM) or some other suitable audio coding algorithm, to form an encoded audio bitstream. The corresponding conventional stereo audio decoding involves reversing the (ADPCM) coding algorithm to recover decoded sum and difference signals, from which left and right audio channels of a decoded stereo output signal are generated.

Although such conventional stereo audio coding/decoding (codec) techniques can produce an auditory scene during playback that accurately reflects the fidelity of the stereo input signal, the amount of data required for the corresponding encoded audio bitstream may be prohibitively large for some applications involving limited storage space and/or transmission bandwidth.

SUMMARY OF THE INVENTION

The '877, '458, and '437 applications describe audio codec techniques that can produce smaller encoded audio bitstreams for the same or substantially similar levels of playback fidelity as those associated with conventional stereo audio codecs. In particular, these patent applications are related to an audio coding technique referred to as binaural cue coding (BCC).

When BCC coding is applied to stereo audio, the left and right channels of the stereo input signal are downmixed (e.g., by summing) to a single mono signal, which is then encoded using a suitable conventional audio coding algorithm such as ADPCM. In addition, the left and right channels are analyzed to generate a stream of BCC parameters. In one implementation, for each audio frame (e.g., 20 msec), the BCC parameters include auditory spatial cues such as an inter-channel or inter-aural level difference (ILD) value and an inter-channel or inter-aural time difference (ITD) value between the left and right channels for each of a plurality of different frequency bands in the stereo input signal. Since the corresponding encoded audio data might include only an encoded mono signal and a stream of BCC parameters, the amount of encoded data may be considerably smaller (e.g., 50-80%) than that for a corresponding encoded audio bitstream generated using conventional stereo audio coding, such as that described previously.

The corresponding BCC decoding involves reversing the (e.g., ADPCM) coding algorithm to recover a decoded mono signal. Stereo audio synthesis techniques are then applied to the decoded mono signal using the BCC parameters to generate left and right channels of a decoded stereo audio signal for playback. Although typically lower than that achieved using conventional stereo audio codecs, the fidelity of an auditory scene generated using BCC coding and decoding may be acceptable for many applications, while typically using lower bandwidth.

Embodiments of the present invention are related to a hybrid audio codec technique in which conventional audio coding is applied to certain frequency bands of the input audio signals, while BCC coding is applied to other frequency bands of the input audio signals. In one possible stereo implementation, signal spectral components whose frequencies above a specified threshold frequency (e.g., 1.5 kHz) are coded using BCC coding, while lower-frequency components are coded using conventional stereo coding. As a result, even higher fidelity playback can be achieved than using only BCC coding, while still reducing the total amount of encoded data compared to conventional stereo coding.

According to one embodiment, the present invention is a method for encoding N input audio signals, where N>1. Each of the N input audio signals is converted into a plurality of spectral components in a frequency domain. For each of one or more, but not all, of the spectral components, the spectral components corresponding to the N input audio signals are downmixed to generate a downmixed spectral component, leaving one or more of the spectral components for each of the N input audio signals unmixed. An encoded audio bitstream is generated based on the one or more downmixed spectral components and one or more unmixed spectral components.

According to another embodiment, the present invention is an encoded audio bitstream generated by performing the previously recited method.

According to another embodiment, the present invention is an apparatus for processing N input audio signals, where N>1, for encoding. One or more transforms are configured to convert each of the N input audio signals into a plurality of spectral components in a frequency domain. A downmixer is configured, for each of one or more, but not all, of the spectral components, to downmix the spectral components corresponding to the N input audio signals to generate a downmixed spectral component, leaving one or more of the spectral components for each of the N input audio signals unmixed.

According to another embodiment, the present invention is a method for decoding an encoded audio bitstream. The encoded audio bitstream is decoded to generate a plurality of spectral components in a frequency domain, wherein one or more sets of the spectral components correspond to downmixed spectral components, and one or more sets of the spectral components correspond to unmixed spectral components. For each set of the downmixed spectral components, one or more auditory spatial parameters are applied to generate a synthesized spectral component. The synthesized spectral components and the unmixed spectral components are converted into N decoded audio signals in a time domain, where N>1.

According to another embodiment, the present invention is an apparatus for decoding an encoded audio bitstream. An audio decoder is configured to decode the encoded audio bitstream to generate a plurality of spectral components in a frequency domain, wherein one or more sets of the spectral components correspond to downmixed spectral components, and one or more sets of the spectral components correspond to unmixed spectral components. A synthesizer is configured, for each set of the downmixed spectral components, to apply one or more auditory spatial parameters to generate a synthesized spectral component. One or more inverse transforms are configured to convert the synthesized spectral components and the unmixed spectral components into N decoded audio signals in a time domain, where N>1.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
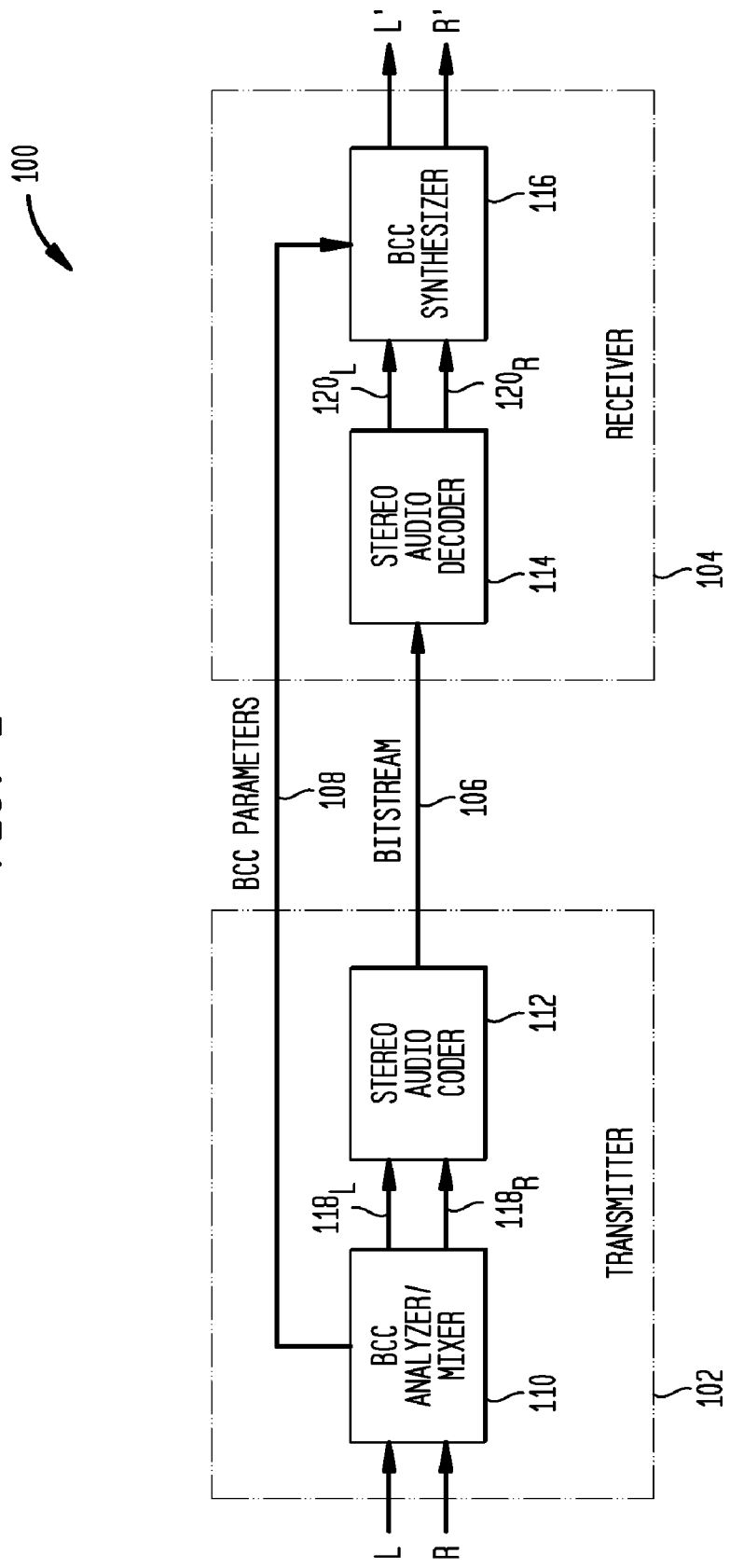
FIG. 1 shows a block diagram of a hybrid audio system, according to one embodiment of the present invention.

FIG. 1 shows a block diagram of a hybrid audio system 100, according to one embodiment of the present invention. Audio system 100 comprises transmitter 102 and receiver 104. Transmitter 102 receives the left (L) and right (R) channels of an input stereo audio signal and generates an encoded audio bitstream 106 and a corresponding stream 108 of BCC parameters, which, depending on the implementation, may or may not be explicitly encoded into bitstream 106. FIG. 1 shows BCC parameter stream 108 being transmitted out-of-band from transmitter 102 to receiver 104. In either case, receiver 104 receives the data generated by transmitter 102, decodes encoded audio bitstream 106, and applies the BCC parameters in stream 108 to generate the left (L') and right (R') channels of a decoded stereo audio signal.

More particularly, transmitter 102 comprises BCC analyzer/mixer 110 and stereo audio coder 112, while receiver 104 comprises stereo audio decoder 114 and BCC synthesizer 116.

In transmitter 102, BCC analyzer/mixer 110 converts the left (L) and right (R) audio signals into the frequency domain. For spectral components above a specified threshold frequency, BCC analyzer/mixer 110 generates BCC parameters for stream 108 using the BCC techniques described in the '877, '458, and '437 applications. BCC analyzer/mixer 110 also downmixes those high-frequency components to mono. Copies of the high-frequency mono component are then converted back to the time domain in combination with the low-frequency "unmixed" left and right components (i.e., the unprocessed frequency-domain components below the specified threshold frequency), respectively, to form hybrid left and right signals 118. Stereo audio coder 112 applies conventional stereo coding to these hybrid left and right signals to generate encoded audio bitstream 106.

Figure 2:
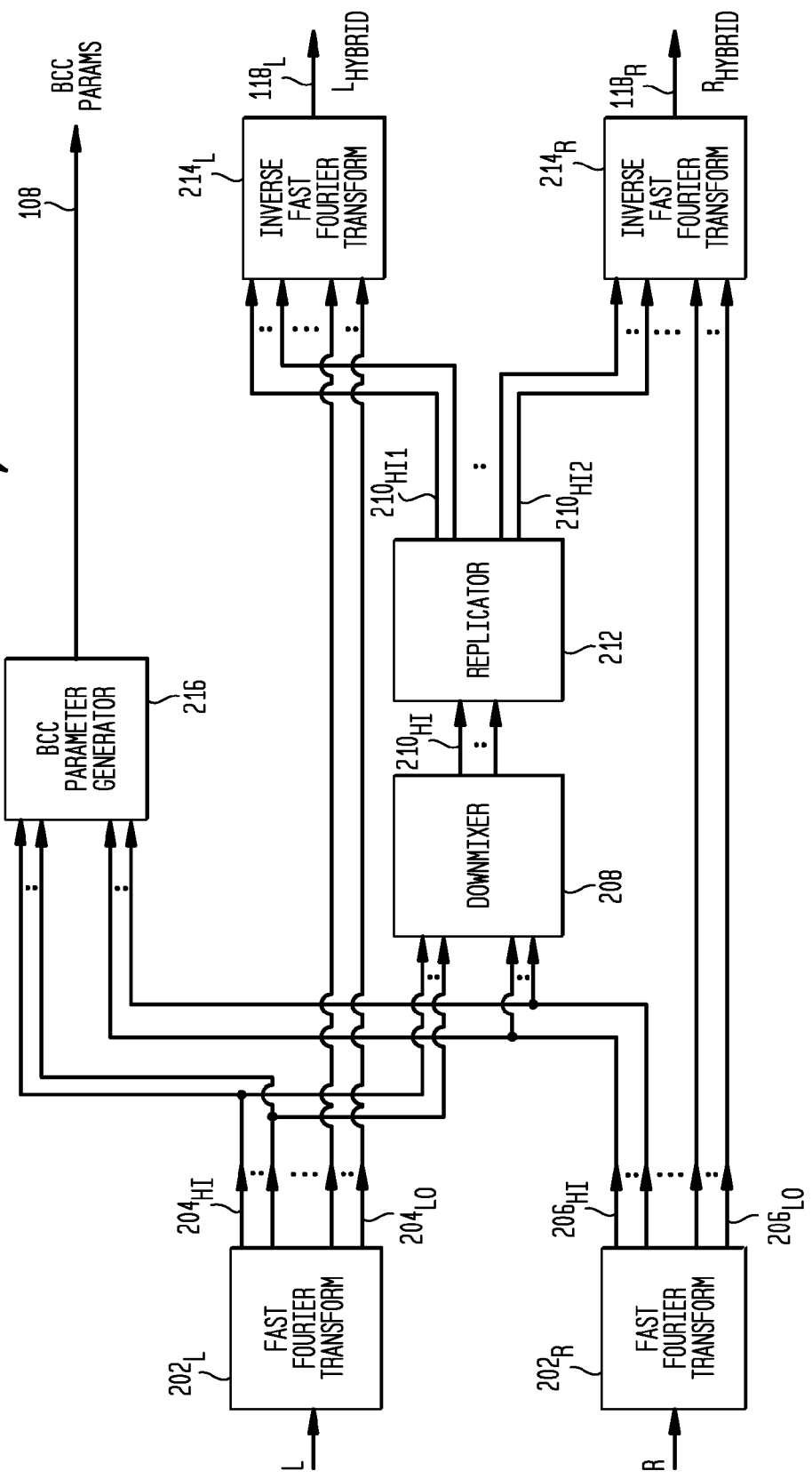
FIG. 2 shows a block diagram of the processing implemented by the BCC analyzer/mixer of FIG. 1, according to one embodiment of the present invention.

FIG. 2 shows a block diagram of the processing implemented by BCC analyzer/mixer 110 of FIG. 1, according to one embodiment of the present invention. Fast Fourier transform (FFT) $202_L$ converts the left audio signal L into a plurality of left-channel spectral components 204 in the frequency domain. Similarly, FFT $202_R$ converts the right audio signal R into a plurality of right-channel spectral components 206 in the frequency domain. The one or more left-channel components $204_{HI}$ and the corresponding one or more right-channel components $206_{HI}$ whose frequencies are above the specified threshold frequency are applied to both downmixer 208 and BCC parameter generator 216.

Downmixer 208 combines each high-frequency left-channel component $204_{HI}$ with its corresponding high-frequency right-channel component $206_{HI}$ to form a high-frequency mono component $210_{HI}$. The processing performed by downmixer 208 to generate the mono components may vary from implementation to implementation. In one possible implementation, downmixer 208 simply averages the corresponding left- and right-channel components. In another possible implementation, downmixer 208 implements the downmixing technique described in the '165 application. Those skilled in the art will appreciate that other suitable downmixing algorithms are possible.

Replicator 212 generates two copies of each high-frequency mono component $210_{HI}$ for application to left and right inverse FFTs (IFFTs) $214_L$ and $214_R$, respectively. IFFTs $214_L$ and $214_R$ also receive the low-frequency left and right components $204_{LO}$ and $206_{LO}$, respectively, from FFTs $202_L$ and $202_R$. IFFTs $214_L$ and $214_R$ convert their respective sets of components back to the time domain to generate the left and right hybrid signals $118_L$ and $118_R$, respectively. The resulting two-channel signal contains identical frequency components within spectral regions that were converted to mono, with the remaining parts being identical to the input signals L and R. As a result, stereo audio coder 112 will typically generate an encoded audio bitstream that has fewer bits than if it were to encode the original input stereo audio signal (L and R).

BCC parameter generator 216 analyzes the high-frequency left and right components $204_{HI}$ and $206_{HI}$ to generate BCC parameters for stream 108 of FIG. 1 for each frequency band above the specified threshold frequency.

Referring again to FIG. 1, in receiver 104, stereo audio decoder 114 applies a conventional stereo decoding algorithm (e.g., to reverse the coding implemented by coder 112) to recover hybrid decoded left and right signals 120. BCC synthesizer 116 applies BCC synthesis techniques to the high-frequency portions of channels 120 to synthesize the high-frequency portions of the decoded left (L') and right (R') channels. In particular, BCC synthesizer 116 converts the hybrid channels 120 to the frequency domain, applies the BCC parameters to the high-frequency components to synthesize high-frequency left and right components using the BCC techniques described in the '877, '458, and '437 applications, and then reconverts the resulting synthesized high-frequency components and corresponding decoded low-frequency components to the time domain.

Figure 3:
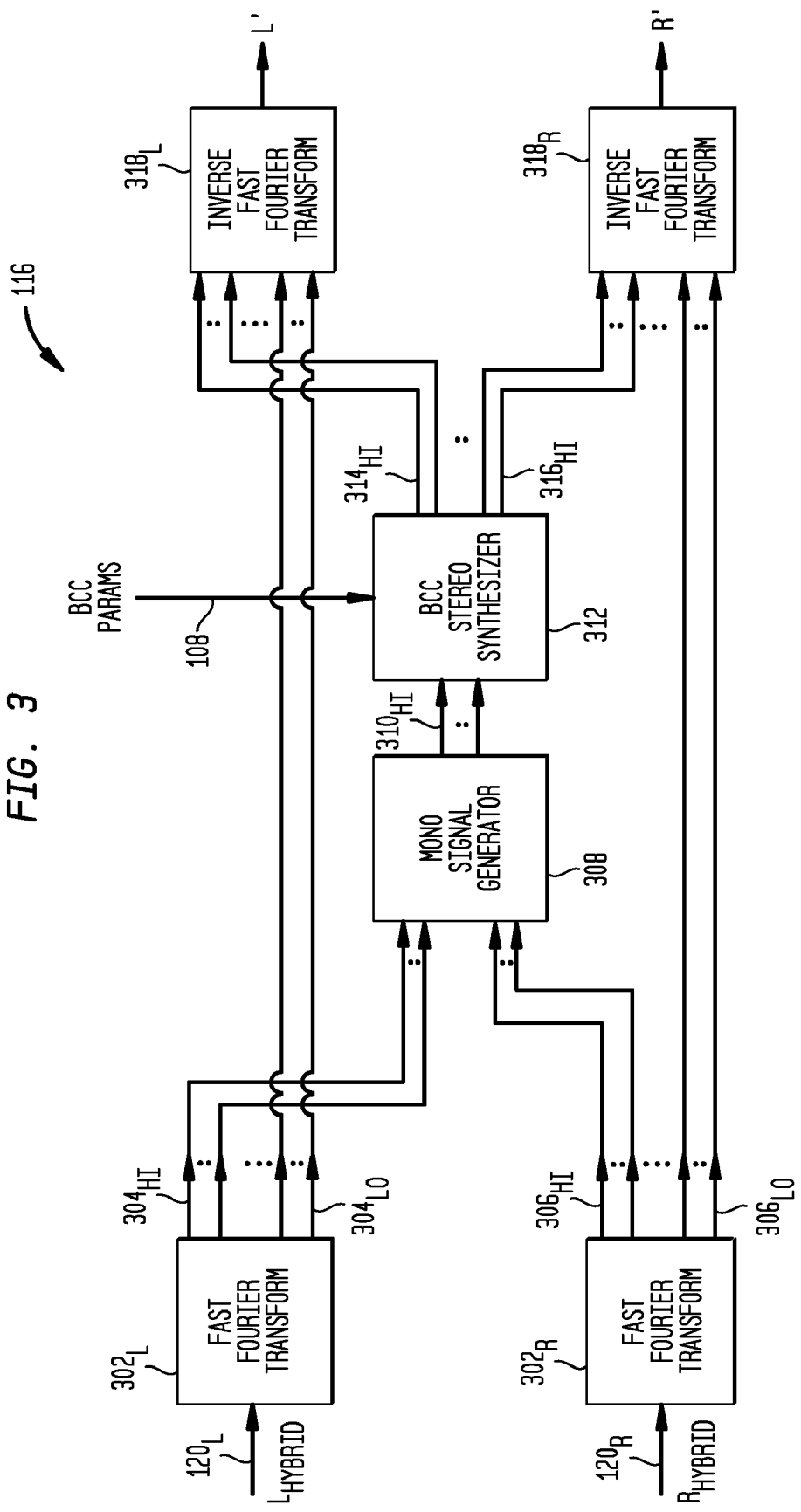
FIG. 3 shows a block diagram of the processing implemented by the BCC synthesizer of FIG. 1, according to one embodiment of the present invention.

FIG. 3 shows a block diagram of the processing implemented by BCC synthesizer 116 of FIG. 1, according to one embodiment of the present invention. FFT $302_L$ converts hybrid left audio signal $120_L$ from stereo audio decoder 114 into a plurality of left-channel spectral components 304 in the frequency domain. Similarly, FFT $302_R$ converts hybrid right audio signal $120_R$ from decoder 114 into a plurality of right-channel spectral components 306 in the frequency domain. The one or more left-channel components $304_{HI}$ and the corresponding one or more right-channel components $306_{HI}$ whose frequencies are above the specified threshold frequency are applied to mono signal generator 308.

Mono signal generator 308 generates a high-frequency mono component for each high-frequency left-channel component $304_{HI}$ and its corresponding high-frequency right-channel component $306_{HI}$. Ideally, since replicator 212 of FIG. 2 generated identical copies of each high-frequency mono component $210_{HI}$, each high-frequency left-channel component $304_{HI}$ should be identical to its corresponding high-frequency right-channel component $306_{HI}$. As such, mono signal generator 308 could simply select either the left channel or the right channel to "generate" the one or more high-frequency mono components $310_{HI}$. Alternatively, mono signal generator 308 could simply average or perform some other suitable downmixing algorithm, including the algorithm described in the '165 application, to generate each mono component $310_{HI}$, in order to account for any real-world differences that may exist between the left and right high-frequency component $304_{HI}$ and $306_{HI}$.

In any case, BCC stereo synthesizer 312 applies BCC processing to generate a high-frequency left-channel component $314_{HI}$ and a high-frequency right-channel component $316_{HI}$ for each high-frequency mono component $310_{HI}$. The high-frequency left- and right-channel components $314_{HI}$ and $316_{HI}$ are applied to left and right IFFTs $318_L$ and $318_R$, respectively. IFFTs $214_L$ and $214_R$ also receive the low-frequency left and right components $304_{LO}$ and $306_{LO}$ respectively, from FFTs $302_L$ and $302_R$. IFFTs $318_L$ and $318_R$ convert their respective sets of components back to the time domain to generate left and right channels L' and R', respectively, of the decoded stereo signal of FIG. 1.

A natural cross-over frequency from the "true" stereo part to the BCC-generated stereo part is 1.5 kHz. Above that frequency the human auditory system does not substantially evaluate inter-aural phase differences for sound localization. Thus, the human auditory system is less sensitive to inter-channel phase errors introduced by BCC processing in that range. Moreover, the most salient auditory localization cues are usually derived from low-frequency components, unless the audio signal has dominant spectral energy at higher frequencies.

The present invention can also be implemented using a hybrid transmitter such as transmitter 102 of FIG. 1, but a receiver that does not perform any BCC processing. In this case, BCC synthesizer 116 of FIG. 1 may be omitted from receiver 104, and the resulting receiver can ignore BCC parameter stream 108 during decoding processing. Legacy receivers that contain only a conventional audio decoder fall into that category. Such a receiver would not provide BCC spatialization of the auditory image for spectral parts of the decoded audio signals that are based on mono components.

However, there is still a remaining stereo effect created by those parts of the spectrum that are preserved as stereo. This stereo effect by itself provides a mechanism for bit-rate reduction as compared to the transmission of the full-bandwidth stereo. Explicitly, mixing parts of the spectrum of the audio input signal to mono reduces the bit rate of a conventional audio coder. The spatial image degradation should be tolerable, if the mono part of the spectrum is limited to frequencies above about 1 kHz.

For some applications, BCC processing may be intentionally limited to transmit only inter-channel level differences as the BCC parameters (i.e., and not any inter-channel time differences). For headphone playback, inter-channel time differences are important for creating a natural spatial image, especially at frequencies below 1.5 kHz. By keeping the stereo signal up to a limit of about 1.5 kHz, the spatial cues in that frequency are available at the receiver and greatly improve the listening experience with headphones.

Transmitting a small spectral bandwidth as a stereo signal does not necessarily increase the bit rate of the audio coder dramatically compared to applying BCC processing to the full spectral range. The audio coder can still take full advantage of those parts of the spectrum that are mono by using, e.g., sum/difference coding. The data rate for the BCC parameters can be reduced, since no parameters need to be transmitted for the spectral part that is kept stereo.

The application of BCC processing to spectral regions can be made adaptive such that an optimum quality/bit-rate tradeoff is achieved. For instance, BCC processing could be switched off for very critical material, or it could be applied to the full spectrum for non-critical material. The spectral region where BCC processing is applied can be controlled, for instance, by one parameter per frame that indicates the upper frequency bound up to which the stereo signal is kept for encoding. In addition, the threshold frequency between stereo and BCC coding could dynamically change based on the number of bits that would actually be used to code different spectral regions of the audio data by the different techniques.

The audio quality range covered by the hybrid codec scheme in FIG. 1 reaches transparent quality when the spectral region of BCC processing has zero bandwidth. With continuously increasing bandwidth for BCC processing, a gradual quality transition from traditional stereo audio coding to the original full-bandwidth BCC coding scheme of the '877, '458, and '437 applications is possible. Therefore, the quality range of the present invention extends to both quality ranges: that of the original BCC scheme and that of the traditional audio coding scheme.

Moreover, the hybrid coding scheme is inherently bit-rate scalable. In terms of the coder structure, such a scheme is also referred to as "layered coding." This feature can be used for instance to reduce the bit rate of a given bitstream to accommodate for channels with lower capacity. For such purposes, the BCC parameters can be removed from the bitstream. In that case, a receiver is still able to decode an audio signal with a reduced stereo image, as described above for the legacy decoder. A further step for reducing the bit rate is meaningful, if the stereo audio coder uses sum/difference coding. It is possible to isolate the difference signal information in the bitstream and remove it. In this case, the receiver will decode only the sum signal, which is a monophonic audio signal.

The different "layers" (e.g., sum, difference, and BCC information) also provide a natural division of the bitstream for unequal error protection for lossy channels. For such applications, the sum signal would get the highest protection and the BCC information would get the lowest protection. If the channel temporarily has a high error rate, then the mono sum signal might still be recoverable, while the difference signal and BCC information might be lost. Such a scheme avoids more audibly annoying frame concealment mechanisms.

Although the present invention has been described in the context of applications in which BCC processing is applied to all and only frequency bands above a specified threshold frequency, the present invention is not so limited. In general, for the hybrid processing of the present invention, BCC processing can be applied to any one or more—but less than all—frequency bands, whether they are contiguous or not, and independent of any threshold frequency.

For example, in one possible implementation, BCC processing is applied to only those frequency bands with energy levels below a specified threshold energy, while conventional stereo encoding is applied to the remaining frequency bands. In this way, conventional stereo encoding optimizes fidelity for the "important" (i.e., high spectral energy) frequency bands, while BCC processing optimizes bandwidth for the less-important (i.e., low spectral energy) frequency bands.

Although the present invention has been described in the context of encoding and decoding a stereo audio signal, the present invention can also be applied to multi-channel applications having more than two input and output channels. Furthermore, the present invention can be applied to applications in which the number of input channels differs from (either higher or lower than) the number of output channels.

Although the present invention has been described in the context of receivers that apply the BCC techniques of the '877, '458, and '437 applications to synthesize auditory scenes, the present invention can also be implemented in the context of receivers that apply other techniques for synthesizing auditory scenes that do not necessarily rely on the techniques of the '877, '458, and '437 applications.

Although the present invention has been described in the context of a real-time system in which the generated data are transmitted immediately from the transmitter to the receiver for real-time decoding and playback, the invention is not so limited. For example, the data generated by the transmitter may be stored in computer memory or other electronic storage medium for subsequent, non-real-time playback by one or more receivers.

Although the present invention has been described in the context of embodiments having an audio coder (e.g., stereo coder 112 of FIG. 1) that encodes hybrid signals in the time domain to generate an encoded audio bitstream and an audio decoder (e.g., stereo decoder 114) that decodes the encoded audio bitstream to recover decoded hybrid signals in the time domain, the present invention is not so limited. Those skilled in the art will understand that the present invention can be implemented in the context of embodiments that code and decode audio data in the frequency domain. For example, the embodiment of FIGS. 1-3 can be modified to replace stereo audio coder 112 and stereo audio decoder 114 with audio codecs that encode and decode, respectively, audio data in the frequency domain. In that case, BCC analyzer/mixer 110 of FIG. 2 can be modified to eliminate replicator 212 and IFFTs 214, and BCC synthesizer 116 of FIG. 3 can be modified to eliminate FFTs 302 and mono signal generator 308. In that case, downmixed (i.e., mono) spectral components $210_{HI}$ generated by downmixer 208 and unmixed spectral components $204_{LO}$ and $206_{LO}$ are passed directly to the frequency-domain audio coder in the transmitter. Similarly, the corresponding downmixed (i.e., mono) and unmixed spectral components recovered by the frequency-domain audio decoder in the receiver are passed directly to BCC stereo synthesizer 312 and IFFTs 318, respectively.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A transmitter-implemented method for encoding N input audio signals, N>1, comprising the steps of:
   (a) the transmitter converting each of the N input audio signals into a plurality of spectral components in a frequency domain;
   (b) for each of one or more, but not all, of the spectral components, the transmitter downmixing the spectral components corresponding to the N input audio signals to generate a downmixed spectral component, leaving one or more of the spectral components for each of the N input audio signals unmixed; and
   (c) the transmitter generating an encoded audio bitstream based on the one or more downmixed spectral components and one or more unmixed spectral components, wherein step (c) comprises the steps of:
      (1) the transmitter replicating each downmixed spectral component to generate a plurality of replicated downmixed spectral components;
      (2) the transmitter converting the plurality of replicated downmixed spectral components and the one or more unmixed spectral components into N hybrid audio signals in a time domain; and
      (3) the transmitter applying an audio coding algorithm to the N hybrid audio signals to generate the encoded audio bitstream.

2. The method as claimed in claim 1, wherein step (b) further comprises the step of generating one or more auditory spatial parameters for the one or more downmixed spectral components.

3. The method as claimed in claim 1, wherein: N=2; the two input audio signals correspond to left and right input audio signals of a stereo input audio signal; each downmixed spectral component is a mono spectral component; and the encoded audio bitstream is generated using a stereo audio coder.

4. The method as claimed in claim 1, wherein:
the one or more downmixed spectral components have frequencies above a specified threshold frequency; and
the one or more unmixed spectral components have frequencies below the specified threshold frequency.

5. The method as claimed in claim 4, wherein the specified threshold frequency varies dynamically over time.

6. The method as claimed in claim 4, wherein the specified threshold frequency varies as a function of bit rate.

7. The method as claimed in claim 1, wherein:
the one or more downmixed spectral components have spectral energies below a specified threshold energy; and
the one or more unmixed spectral components have spectral energies above the specified threshold energy.

8. An apparatus for processing N input audio signals, N>1 for encoding, comprising:
(a) one or more transforms configured to convert each of the N input audio signals into a plurality of spectral components in a frequency domain; and
(b) a downmixer configured, for each of one or more, but not all, of the spectral components, to downmix the spectral components corresponding to the N input audio signals to generate a downmixed spectral component, leaving one or more of the spectral components for each of the N input audio signals unmixed, wherein the apparatus is configured to replicate each downmixed spectral component to generate a plurality of replicated downmixed spectral components and convert the plurality of replicated downmixed spectral components and the one or more unmixed spectral components into N hybrid audio signals in a time domain.

9. The apparatus of claim 8, further comprising an audio coder configured to apply an audio coding algorithm to the N hybrid audio signals to generate an encoded audio bitstream.

10. A receiver-implemented method for decoding an encoded audio bitstream, the method comprising the steps of:
(a) the receiver decoding the encoded audio bitstream to generate a plurality of spectral components in a frequency domain, wherein:
one or more sets of the spectral components correspond to replicated downmixed spectral components; and
one or more sets of the spectral components correspond to unmixed spectral components;
(b) for each set of the replicated downmixed spectral components, the receiver converting the replicated downmixed spectral components into a single downmixed spectral component and applying one or more auditory spatial parameters to the single downmixed spectral component to generate a plurality of synthesized spectral components; and
(c) the receiver converting the synthesized spectral components and the unmixed spectral components into N decoded audio signals in a time domain, N>1, wherein step (a) comprises the steps of:
(1) the receiver decoding the encoded audio bitstream to recover N hybrid audio signals; and
(2) the receiver converting each of the N hybrid audio signals into the plurality of spectral components in the frequency domain.

11. The method as claimed in claim 10, wherein: N=2; the encoded audio bitstream is decoded using a stereo audio decoder; the two hybrid audio signals correspond to left and right hybrid audio signals of a hybrid stereo audio signal; and each downmixed spectral component is a mono spectral component.

12. The method as claimed in claim 10, wherein:
the one or more downmixed spectral components have frequencies above a specified threshold frequency; and
the one or more unmixed spectral components have frequencies below the specified threshold frequency.

13. The method as claimed in claim 12, wherein the specified threshold frequency varies dynamically over time.

14. The method as claimed in claim 12, wherein the specified threshold frequency varies as a function of bit rate.

15. The method as claimed in claim 10, wherein:
the one or more downmixed spectral components have spectral energies below a specified threshold energy; and
the one or more unmixed spectral components have spectral energies above the specified threshold energy.

16. An apparatus for decoding an encoded audio bitstream, the apparatus comprising:
(a) an audio decoder configured to decode the encoded audio bitstream to generate a plurality of spectral components in a frequency domain, wherein:
one or more sets of the spectral components correspond to replicated downmixed spectral components; and
one or more sets of the spectral components correspond to unmixed spectral components;
(b) a synthesizer configured, for each set of the replicated downmixed spectral components, to convert the replicated downmixed spectral components into a single downmixed spectral component and apply one or more auditory spatial parameters to the single downmixed spectral component to generate a plurality of synthesized spectral components; and
(c) one or more inverse transforms configured to convert the synthesized spectral components and the unmixed spectral components into N decoded audio signals in a time domain, N>1, wherein the audio decoder is configured to:
(1) decode the encoded audio bitstream to recover N hybrid audio signals; and
(2) convert each of the N hybrid audio signals into the plurality of spectral components in the frequency domain.

17. The apparatus as claimed in claim 16, wherein: N=2; the audio decoder is a stereo audio decoder; the two hybrid audio signals correspond to left and right hybrid audio signals of a hybrid stereo audio signal; and each downmixed spectral component is a mono spectral component.

* * * * *